UNITED STATES PATENT OFFICE.

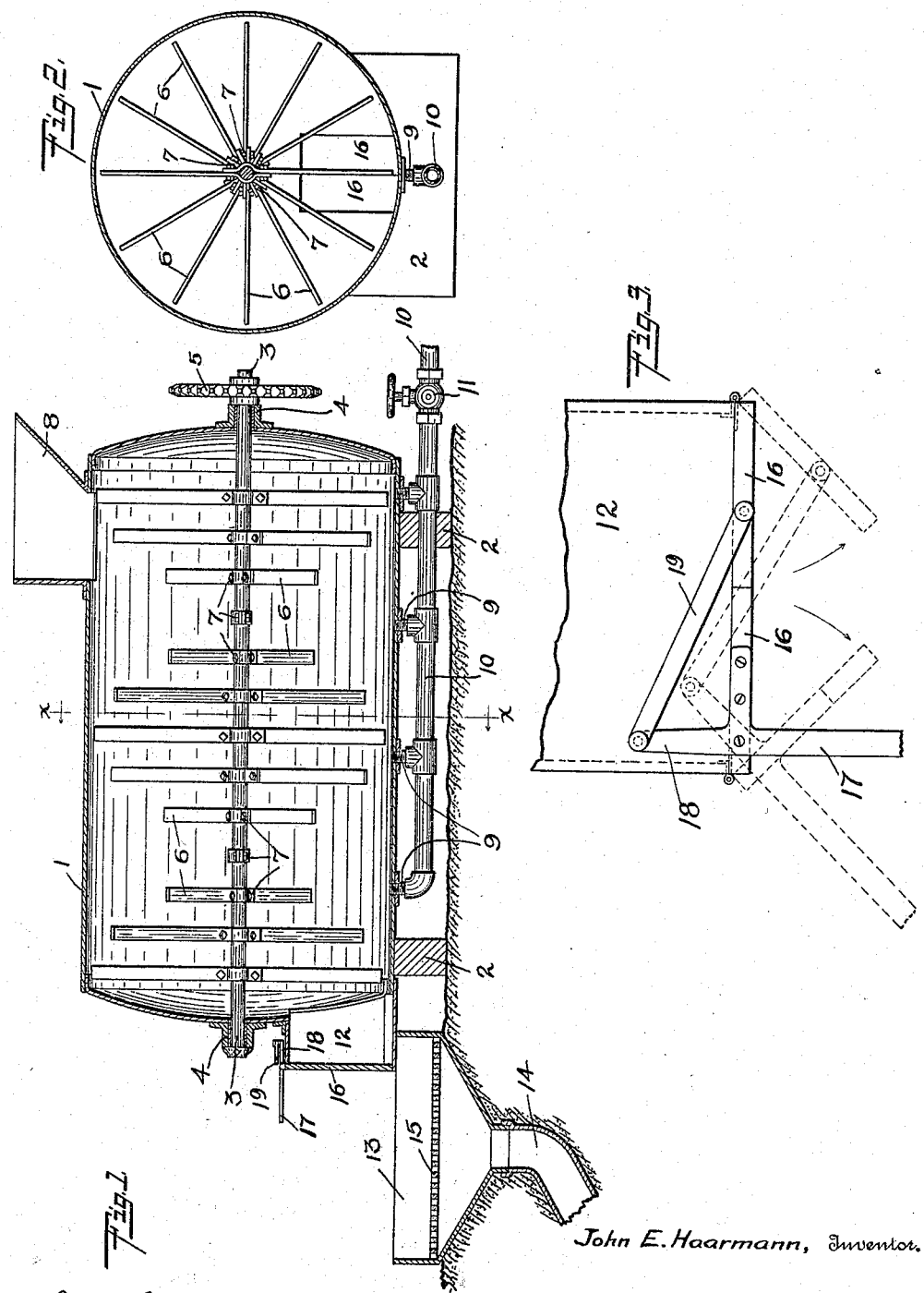

JOHN E. HAARMANN, OF OMAHA, NEBRASKA.

HYDRAULIC DIRT-CONVEYER.

932,544.

Specification of Letters Patent.  Patented Aug. 31, 1909.

Application filed May 25, 1907. Serial No. 375,728.

*To all whom it may concern:*

Be it known that I, JOHN E. HAARMANN, a citizen of the United States, and a resident of Omaha, in the county of Douglas and State of Nebraska, have invented certain new and useful Improvements in Hydraulic Dirt-Conveyers, of which the following is a specification.

My invention relates to hydraulic dirt conveyers and it is the object thereof to provide apparatus for facilitating the removal of earth in banks or excavations for building purposes in cities and other places where a supply of water and storm-sewer or other drainage connections are available. My invention is applicable for excavation works under the above conditions and where the earth removed is of clay, loam or other composition which may be rendered fluid by admixture with a suitable quantity of water.

Apparatus embodying my invention is shown in the accompanying drawings in which—

Figure 1 is a longitudinal section thereof, Fig. 2 is a transverse section of the mixing tank or receiver, on the line $x$—$x$ of Fig. 1, and Fig. 3 is a detail plan view of the discharge spout and gates.

In the construction shown I provide a cylindrical receiver 1 which is disposed in a horizontal position and may be supported by suitable saddle pieces 2. Passing longitudinally through the receiver is a shaft 3 which is journaled in bearings 4 in the ends thereof, and one end of which extends outside the receiver and has thereon a sprocket wheel 5 for connection by chain with a source of power for driving the shaft. Inside the receiver at regular intervals on the shaft are secured pairs of mixing blades 6, each pair of which are secured together and clamped upon the shaft by bolts 7, the various pairs of blades being disposed at different radial positions, as clearly shown in Fig. 2.

At one end of the receiver on the upper side thereof is an opening to which may be fitted a suitable chute or a hopper 8. At the lower side of the receiver a plurality of water inlet nozzles 9 are connected therewith, all of said nozzles connecting in turn with a water supply pipe 10 which is provided with a suitable controlling valve 11.

At the lower part of the end of the receiver opposite the hopper 8 is an opening to which is connected the discharge spout 12 which opens over a trough 13 provided with an inclined bottom leading to a drainage pipe 14. Above the inclined bottom of the trough is a grating 15 for separating from the discharged materials any bodies or masses of material too large to be readily washed away through the drainage pipe.

At the outer end of the discharge spout the same is provided with gates 16 hinged at the sides of the spout and openable outwardly as shown by the dotted lines in Fig. 3. On one of said gates is a handle 17 having a rearwardly extending arm 18 thereon which arm is connected by a bar 19 with the other gate. Said arm and bar are so proportioned that by movement of the handle to open the one gate the other gate will be opened a like amount by said arm and bar connection, the parts appearing as shown by the dotted lines in Fig. 3.

In the operation of the apparatus water is supplied thereto through the pipe 10 and nozzles 9, the shaft is driven from a suitable source of power, and the earth as excavated by scrapers or shovels is dumped through the hopper 8 into the receiver where it is rapidly mixed with the water and reduced to a fluid condition by the mixing blades. The gates 16 are opened to permit a continuous discharge of material, the extent of opening being so regulated by the operator or attendant as to maintain a suitable height of water in the receiver. From time to time the gates may be opened to their full extent so as to permit any accumulation of debris consisting of sticks, rocks or the like to be removed from the receiver or flushed out onto the grating 15, the materials accumulating thereon being removed by the attendant as occasion may require.

Now, having described my invention, what I claim and desire to secure by Letters Patent is:

1. In a hydraulic dirt conveyer, the combination with a receiver having openings for the admission thereto of earth and water, of mixing blades working within the receiver, regulated means for continually supplying water through said openings therefor, a discharge spout connecting with the lowest part of the receiver a pair of gates hinged at the sides of said discharge spout and arranged to normally form a narrow slot between them, a handle connected with one of said gates, and means connecting said gate with the other gate whereby movement of said handle will simultaneously actuate both of the gates and swing the same away from each other to increase the normal width of the opening between them.

2. In a hydraulic dirt conveyer, the combination with a cylindrical horizontally-disposed receiver having a plurality of valved water pipes connecting therewith near the bottom thereof, a chute or hopper opening thereinto at the top and near one end thereof, and a discharge spout connected therewith at the bottom of the end opposite the chute or hopper, of a longitudinally extending shaft journaled in the ends of said receiver, mixing blades carried on said shaft, gates pivotally connected at the sides of the discharge spout, said gates permitting a continuous gravity discharge of materials from the receiver but normally restricting the flow of materials through said spout, and means connecting said gates whereby the same may be simultaneously opened to permit an unobstructed flow of materials through the spout.

In testimony whereof I have hereunto subscribed my name in the presence of two witnesses.

JOHN E. HAARMANN.

Witnesses:
    D. O. BARNELL,
    C. C. A. BAUERCAMPER.